United States Patent [19]

Ternes et al.

[11] Patent Number: 4,935,894
[45] Date of Patent: Jun. 19, 1990

[54] MULTI-PROCESSOR, MULTI-BUS SYSTEM WITH BUS INTERFACE COMPRISING FIFO REGISTER STOCKS FOR RECEIVING AND TRANSMITTING DATA AND CONTROL INFORMATION

[75] Inventors: Robert J. Ternes, Scottsdale, Ariz.; Christopher A. Huey, Pine, Colo.; Robert W. Bruner, Phoenix, Ariz.

[73] Assignee: Motorola, Inc., Schaumburg, Ill.

[21] Appl. No.: 91,675

[22] Filed: Aug. 31, 1987

[51] Int. Cl.⁵ .................... G06F 3/00; G06F 15/16; G06F 13/00
[52] U.S. Cl. ................... 364/900; 364/927.92; 364/927.93; 364/927.98; 364/927.11; 364/935; 364/935.2; 364/935.4; 364/935.46; 364/932.8
[58] Field of Search ... 364/200 MS File, 900 MS File

[56] References Cited

U.S. PATENT DOCUMENTS

| | | |
|---|---|---|
| 4,205,373 | 5/1980 | Shah et al. .................... 364/200 |
| 4,234,919 | 11/1980 | Bruce et al. .................... 364/200 |
| 4,263,649 | 4/1981 | Lapp, Jr. .................... 364/200 |
| 4,309,754 | 1/1982 | Dinwiddi, Jr. .................... 364/200 |
| 4,319,338 | 5/1982 | Grudowski et al. .................... 364/900 |
| 4,422,142 | 12/1983 | Inaba et al. .................... 364/200 |
| 4,451,886 | 5/1984 | Guest et al. .................... 364/200 |
| 4,456,994 | 6/1984 | Segarra .................... 371/16 |
| 4,625,307 | 11/1986 | Tulpule et al. .................... 370/85 |
| 4,698,753 | 10/1987 | Hubbins et al. .................... 364/200 |
| 4,723,238 | 2/1988 | Isreal et al. .................... 370/60 |
| 4,744,023 | 5/1988 | Welsch .................... 364/200 |

OTHER PUBLICATIONS

"CMOS Parallel First-In/First-Out FIFO 512×9 Bit & 1024×9 Bit", Military and Commercial Temperature Ranges, pp. 2-34-2-42.

*Primary Examiner*—David Y. Eng
*Assistant Examiner*—Emily Y. Chan
*Attorney, Agent, or Firm*—Walter W. Nielsen

[57] ABSTRACT

A multi-processor, multi-bus system comprises a host processor and a cluster controller coupled to a first type of bus; a local processor coupled to a second type of bus; and bus interface circuits coupled to the first and second bus types for selectively enabling the second bus to be coupled to the host processor, and for selectively enabling the first bus to be coupled to the local processor. Both bus types are asynchronous. Each bus interface circuit comprises a first-in-first-out (FIFO) register, interrupt logic, and transmitter/receiver logic. The pair of bus interface circuits together provide dual simplex data transfer between the local processor and the cluster controller which is directed by a parallel data ling (PDL) protocol. The protocol utilizes a 16-bit wide control word. The most significant bit 15, referred to as the command bit, is a "one" whenever bits 0-7 contain a command byte, while the command bit is "zero" whenever bits 0-7 contain a data byte. A logical unit number specified in bits 8-14 indicates to which of 128 possible logical devices the information transfer is destined.

8 Claims, 6 Drawing Sheets

MULTI-PROCESSOR, MULTI-BUS SYSTEM WITH BUS INTERFACE COMPRISING FIFO REGISTER STOCKS FOR RECEIVING AND TRANSMITTING DATA AND CONTROL INFORMATION

BACKGROUND OF THE INVENTION

1. Field of the Invention

This invention relates generally to the area of digital data processing systems and, in particular, to the interfacing of two different asynchronous bus-based computer systems.

2. Description of the Related Art

As is well known, there exist many diverse types of data processing systems. These different computer systems provide many different functions and have many different characteristics. For any given type of data processing system, there are certain advantages and certain disadvantages in comparison with other types of data processing systems.

A first well-known type of computer system, commonly referred to as an IBM 3270 System, has found wide-spread commercial use in applications such as data entry, word processing, transaction-handling, data communications, etc. There are many known types of IBM and IBM-compatible 3270 systems in use by nearly all of the Fortune 1000 companies.

Typically, an IBM 3270 System comprises a plurality of IBM 3270 terminals coupled to an IBM host processor by means of an IBM 3274 controller. Both the host processor and the controller are coupled to a system bus known as an IBM Multibus. The structure and functionality of the IBM Multibus conform to a uniquely defined bus specification with respect to a wide variety of bus parameters such as the number and width of channels, bus timing, parity, etc.

In the aforementioned IBM 3270 System, the IBM 3270 terminals are coupled to the IBM 3274 controller by means of two-conductor, twisted-pair coaxial cables referred to as RG62 cables. As there is a very large quantity of IBM 3270 Systems installed throughout the world, there is also a very large quantity of IBM 3270 terminals. Correspondingly, there is also a very large investment in installed coaxial cable coupling such IBM 3270 terminals to their respective IBM 3274 controllers. The current rate for installation of RG62 cabling is approximately $10–25 per linear foot.

It would be highly desirable to extend the useful life of the expensive investment in IBM 3270 System equipment and cable installation by giving the IBM 3270 System additional up-to-date functionality. New functionality is currently provided, for example, by data processing systems operating under the UNIX operating system commercially available from AT&T Information Systems, Inc. Such data processing systems are widely available.

The UNIX operating system supports improvements in development software, application software, and distributed data processing software which are not available using the IBM 3270 System alone. In addition, certain commercially available processors operating under the UNIX operating systems represent the leading edge in processor versatility and throughput.

Many UNIX-based computer systems utilize a VME system bus. The VME bus is a widely used standard bus. A large number of processors and associated memory and peripheral equipment are compatible with the VME bus, and they are commercially available from many different vendors worldwide. Much of this equipment cannot be connected to the IBM Multibus. For example, at the present time the IBM 3274 controller does not support many types of printers and data storage devices. It currently supports only dot matrix and line printers. Thus, it would be very desirable if there were a way to connect new varieties of peripheral equipment to IBM 3274 controllers operating on the IBM Multibus.

It would be of significant economic benefit to offer the installed base of IBM and IBM-compatible 3270 systems the capability of running UNIX-based application software and of benefiting from the enhanced features of recent 32-bit, high-speed processors and peripheral equipment, such as laser printers.

It would also be highly desirable for users of UNIX-based data processing systems to have the ability to perform IBM 3270 System functions from the UNIX-based system terminals. Such functions include many valuable software applications which are resident in the 3270 host computer but which are not available in UNIX-based systems.

Thus a circuit for interfacing between an IBM 3270 system and a VME system is required to achieve the above-described functionality. More specifically a circuit for interfacing the asynchronous IBM Multibus and the asynchronous VME bus is required.

A known prior art circuit for interfacing two different data processing systems operated by locking the two different system buses together. Whenever one system bus was in use, operations on the other system bus had to be halted until the first system bus was again free. This had a significantly adverse effect on the operation of both computer systems. There is thus a significant need for an interface between two different asynchronous system buses having the features described above, in which each system bus can operate independently of the other.

SUMMARY OF THE INVENTION

The present invention pertains to a multi-processor, multi-bus system which utilizes a pair of bus interface circuits between two different computer systems having first and second bus types to enable users of either computer system to access either system. Each bus interface circuit comprises a first-in-first-out (FIFO) register stack, interrupt logic, and transmitter/receiver logic. The pair of bus interface circuits provides dual simplex data and control transfer between the two buses.

The data and command transfer between processors in the system is accomplished by a protocol which utilizes a fixed 16-bit wide format control word. The most significant bit 15, referred to as a command bit, is a "one" whenever bits 0–7 contain a command byte, while the command bit is "zero" whenever bits 0–7 contain a data byte. A logical unit number specified in bits 8–14 indicates to which of 128 possible logical devices the information transfer is destined to go.

Thus it is an object of the present invention to provide a new and improved bus interface circuit for coupling two computer systems having different types of system buses which enables users on either computer system to run programs on either computer system.

It is also an object of the present invention to provide a new and improved bus interface circuit for coupling two computer systems having different types of system buses which enables users on either computer system to utilize processor(s) and/or peripheral equipment coupled to either computer system.

It is a further object of the present invention to provide a new and improved bus interface circuit for coupling two computer systems having different types of system buses which enables users on either computer system to obtain the above-mentioned results without disrupting the operation of either computer system.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
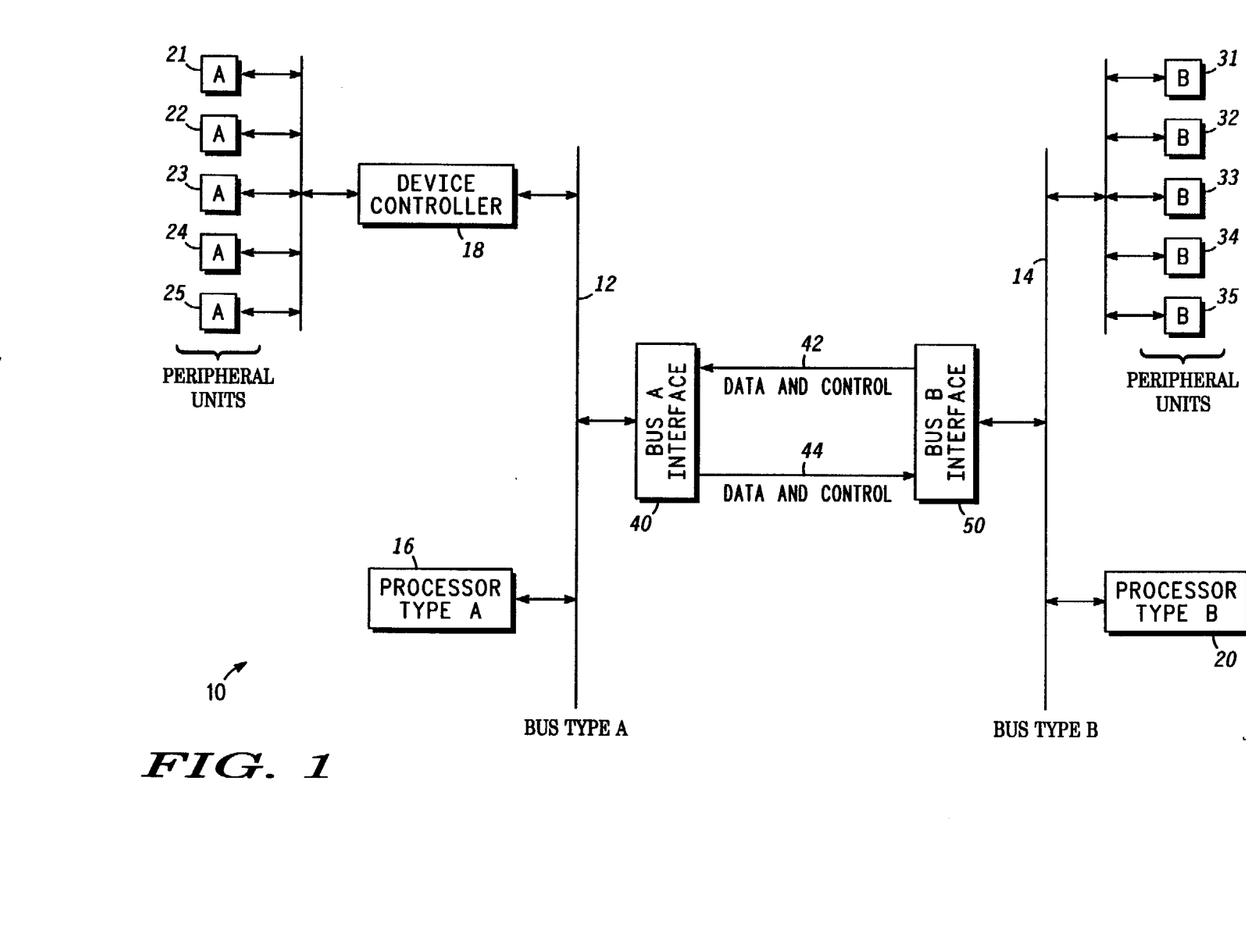
FIG. 1 is a block diagram of a multi-processor, multi-bus system having an interface embodying the present invention.

Referring specifically to FIG. 1, a system, generally labeled 10, is shown. System 10 has two asynchronous buses 12 and 14. Bus 12 has coupled to it a processor 16 and a device controller 18. A series of peripheral units 21-25 are coupled to and controlled by device controller 18. Peripheral units 21-25 may be work stations, printers, and the like.

In a preferred embodiment of the present invention, processor 16 is a standard Intel processor, controller 18 is a specialized controller for IBM coax-A devices, and at least one of peripheral units 21-25 are IBM Model 3270 terminals. It will be understood that plug-compatible units may be substituted for IBM units.

Bus 14 has a processor 20 and a series of peripheral units 31-35 coupled to it. Processor 20 is of a different type than processor 16.

In a preferred embodiment of the invention, processor 20 is a Motorola 68020 processor running under the UNIX operating system, and at least one of peripheral units 31-35 is a terminal unit.

Situated between buses 12 and 14 are a bus interface 40 associated with bus 12 and a bus interface 50 associated with bus 14. A dual simplex path for data and control information is created by buses 42 and 44. A dual simplex path is a path wherein information is transferred between two elements in one direction along one line connecting them, and simultaneously in the opposite direction along a second line connecting them.

As indicated by directional arrows in FIG. 1, bus 42 transfers data and control information from bus interface 50 to bus interface 40, while bus 44 transfers data and control information from bus interface 40 to bus interface 50.

Bus interfaces 40 and 50 allow peripheral units 21-25 to access processor 20, and they also allow peripheral units 31-35 to access processor 16. This functionality of system 10 is achieved while keeping the operation of buses 12 and 14 independent and will be described in greater detail in succeeding paragraphs.

It should be apparent to those skilled in the art that while peripheral units 21-25 have been shown connected through controller 18 to bus 12, and peripheral units 31-35 have been shown connected to bus 14, these elements are not essential to the present invention. Situations may arise where two types of processors are required to be joined, but no peripheral units are necessary on one bus or the other. Furthermore, while five peripheral units have been shown attached to each bus in FIG. 1 for illustrative purposes, more or less peripheral units are possible.

Figure 2:
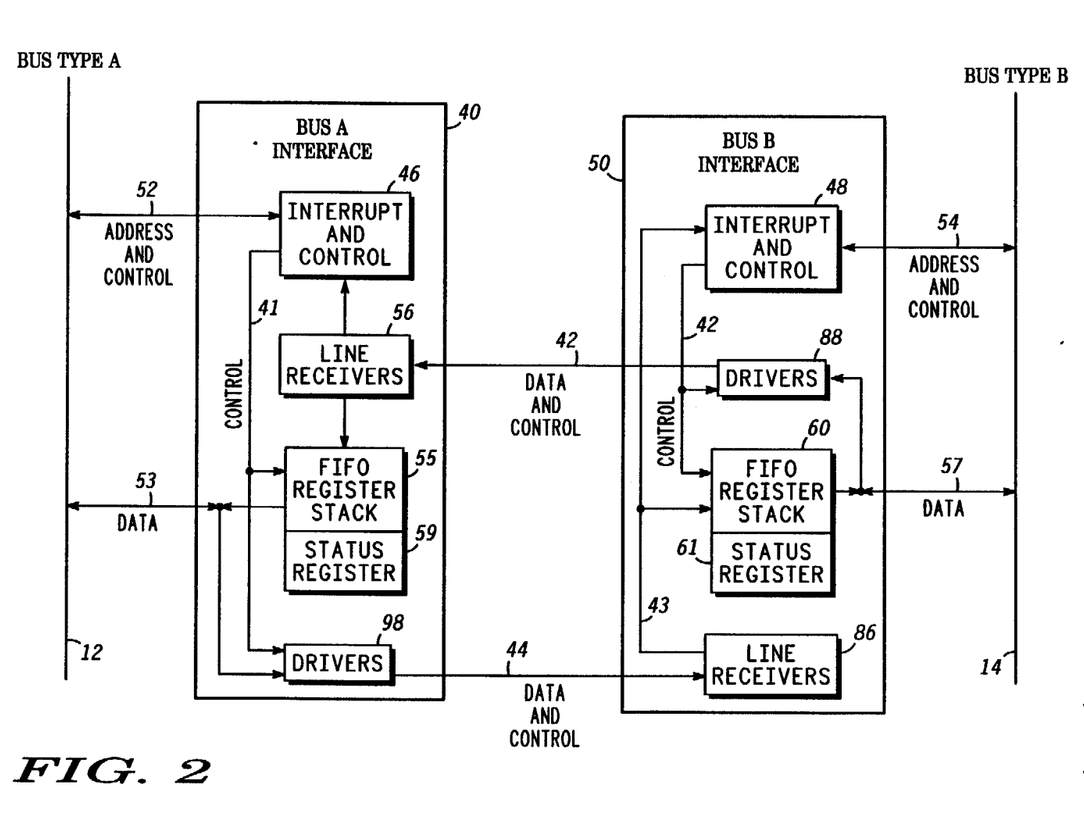
FIG. 2 is a more detailed block diagram of the bus A and bus B interfaces illustrated in FIG. 1.

Referring specifically to FIG. 2, a more detailed block diagram of bus interfaces 40 and 50 is shown. Bus interface 40 includes interrupt and control logic 46 and a FIFO register stack 55. Associated with FIFO register stack 55 is a status register 59. Bus interface 50 includes interrupt and control logic 48 and a FIFO register stack 60. Associated with FIFO register stack 60 is a status register 61. A dual simplex path for data and control information is achieved by interconnecting buses 42 and 44.

FIFO register stack 55 receives data from bus 14 via data bus 57, drivers 88, data and control bus 42, and line receivers 56 and transfers it to bus 12 FIFO register stack 55 receives control information from bus 14 via address and control bus 54, interrupt and control logic 48, control bus 42, drivers 88, data and control bus 42, and line receivers 56. FIFO register stack 55 and drivers 98 also receive control information over control bus 41 via line receivers 56, bus 46, and interrupt and control logic 46. Similarly, FIFO register stack 60 receives data from bus 12 via data bus 53, drivers 98, data and control bus 44, and line receivers 86 and transfers it to bus 14. FIFO register stack 60 receives control information from bus 12 via address and control bus 52, interrupt and control logic 46, control bus 41, drivers 98, data and control bus 44, and line receivers 86. FIFO register stack 60 and drivers 88 also receive control information over control bus 42 via line receivers 86, bus 43, and interrupt and control logic 48. Furthermore, address and control information is generated bi-directionally along bus 52 between interrupt and control logic 46 bus 12, and along bus 54 between interrupt and control logic 48 and bus 14. This assures synchronism between the functioning of bus 12 and bus 14.

Figure 3:
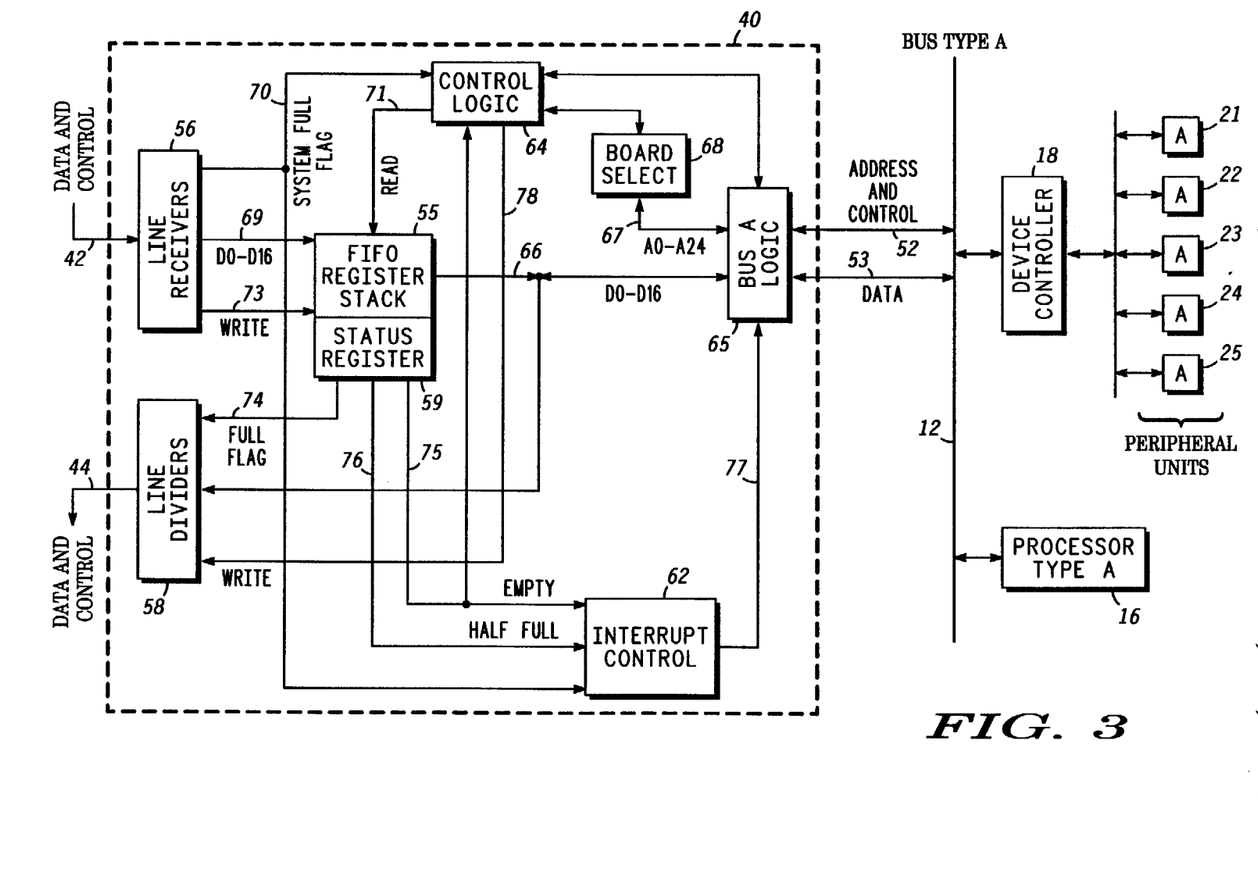
FIG. 3 is a detailed block diagram of the bus A interface illustrated in FIG. 1.

A detailed block diagram of bus interface 40 appearing between bus 12 and buses 42 and 44 is illustrated in FIG. 3. Line receivers 56 receive data and control information from bus 42. Control information is passed to control logic means 64 via line 70, and data information is transferred through bus 69 to FIFO register stack 55. Bus 69 is 16-bits wide. If FIFO register stack 55 is a 512×18 register stack, two bits in each line of FIFO register 55 are ignored. Also, a predetermined number of lines in FIFO register stack 55 acts as a buffer.

FIFO register stack 55 serves as a read FIFO register if a READ signal is supplied on line 71 from control logic means 64. Alternatively, FIFO register stack 55 serves as a write register stack if a WRITE signal is supplied on line 73. A WRITE signal on line 73 would be generated from control logic means 94 of the bus B interface 50 (See FIG. 4).

FIFO register stack 55 has a status register 59 to indicate the level of data information in the part of FIFO register stack 55 which is being utilized as a buffer. If the buffer is full, a FULL FLAG signal indicating this is sent along line 74 to control logic means 94 of the bus B interface; if the buffer is half full, a HALF FULL signal is generated along line 76 to interrupt control means 62; and, if the buffer is empty an EMPTY signal is generated along line 75 to control logic means 64 and interrupt control means 62. FIFO register stacks 55 and 60 can be any of several commercially available parts with the required functions such as Integrated Device Technology Part No. IDT7201.

Interrupt control means 62 sends control signals to processor 16 through bus 77 and bus logic 65. Bus logic 65 controls and correlates information flowing from bus 12 to other elements in the system. Board select logic 68 controls bus logic board 65 by means of bus 67. FIFO 55 has a data output bus 66 for sending data either to bus 12 (through bus logic 65) or to line drivers 58.

Figure 4:
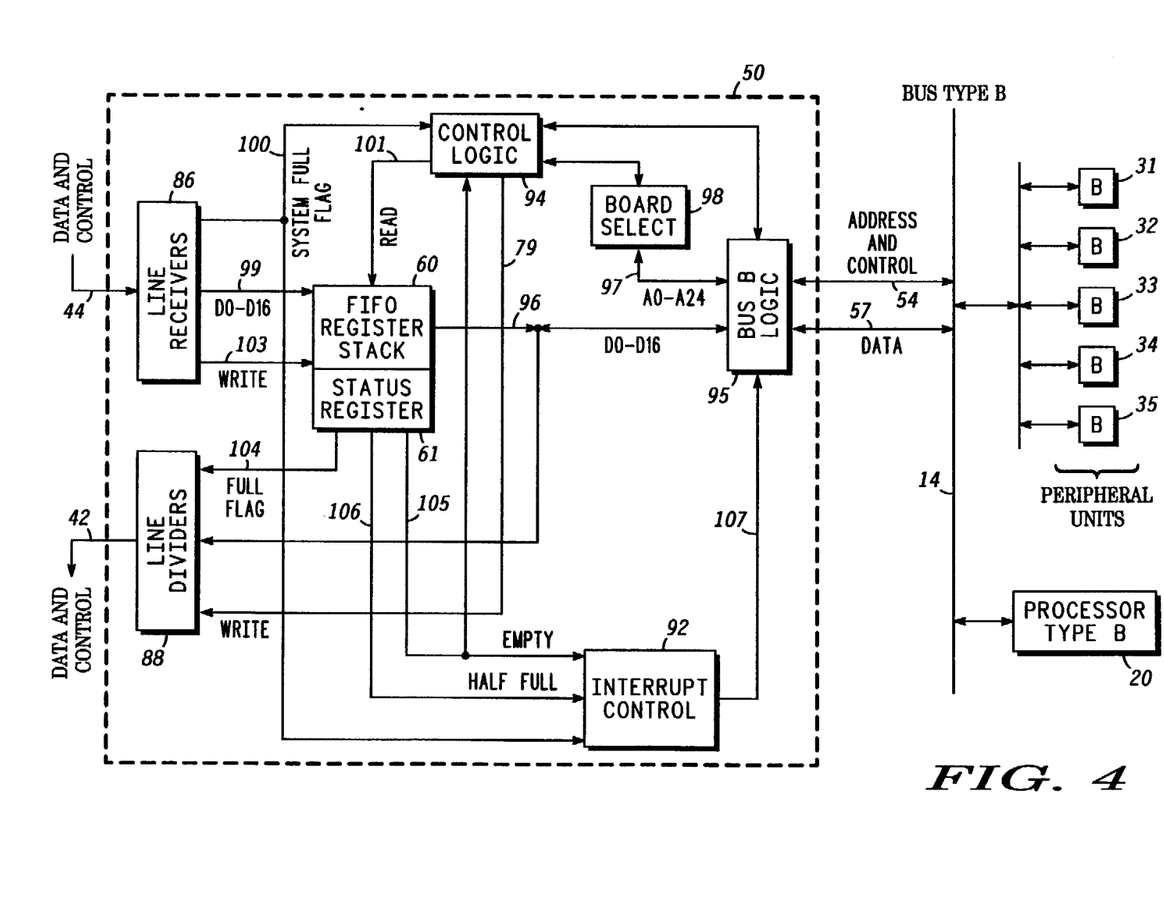
FIG. 4 is a detailed block diagram of the bus B interface illustrated in FIG. 1.

Referring now specifically to FIG. 4, a detailed block diagram of bus interface 50 appearing between bus 14 and buses 42 and 44 is shown. The operation of the elements in FIG. 4 is identical to the corresponding elements in FIG. 3. Bus logic 95 differs slightly from bus logic 65, since it must interface with bus 14 which is of a different type than bus 12.

Figure 5:
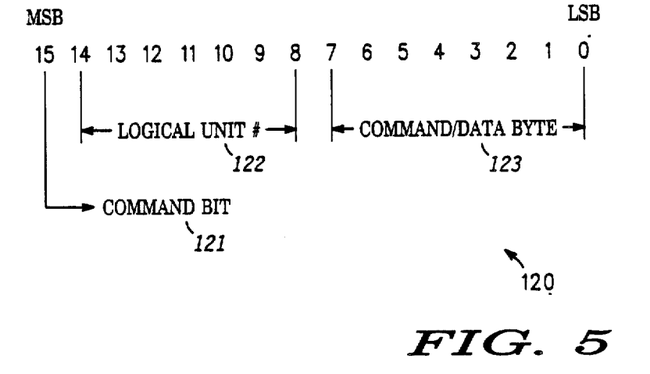
FIG. 5 is an illustration of the format of a 16-bit control word used in the present invention.

Referring now specifically to FIG. 5, a fixed 16-bit control word 120 is illustrated. Control word 120 is used as part of a parallel data link (PDL) protocol for the transfer of commands and data between processor 16 and processor 20. The PDL protocol enables up to 128 logical devices to be logically connected in the system. The PDL protocol supports two kinds of transfers: data transfers and command transfers. Data transfers can be either single-byte data transfers or multi-byte data transfers.

The most significant bit (MSB) 15 of control word 120, labeled as a command bit 121, is a logical "one" whenever bits 0 through 7 contain a valid command byte 123. The command bit is a logical "zero" when bits 121 0 through 7 contain a valid data byte 123.

A logical unit number 122 contained in bits 8 through 14 specifies the logical device to which the transfer is destined to go. Since the logical unit number 122 comprises seven bits, the logical unit number 122 has a range of 0 to 127.

In a summary, bits 0 through 7 of control word 120 contain a Command Byte (if bit 15 is set) or a Data Byte (if bit 15 is not set) for the logical device specified in bits 8 through 14.

As previously stated, data transfers can be either multi-byte or single-byte in nature. The choice of which type of transfer to use is determined by many system design considerations. One such consideration is the amount of data that is to be transferred. If there are four or fewer bytes to transfer, single-byte data transfer is more efficient. However, if there are five or more bytes to transfer, multi-byte data transfer is utilized.

Single-byte data transfers are accomplished by placing the data byte 123 to be transferred in bits 0 through 7 of control word 120, placing the logical unit number 122 in bits 8 through 14, and clearing the command bit 121 to "zero".

Figure 6:
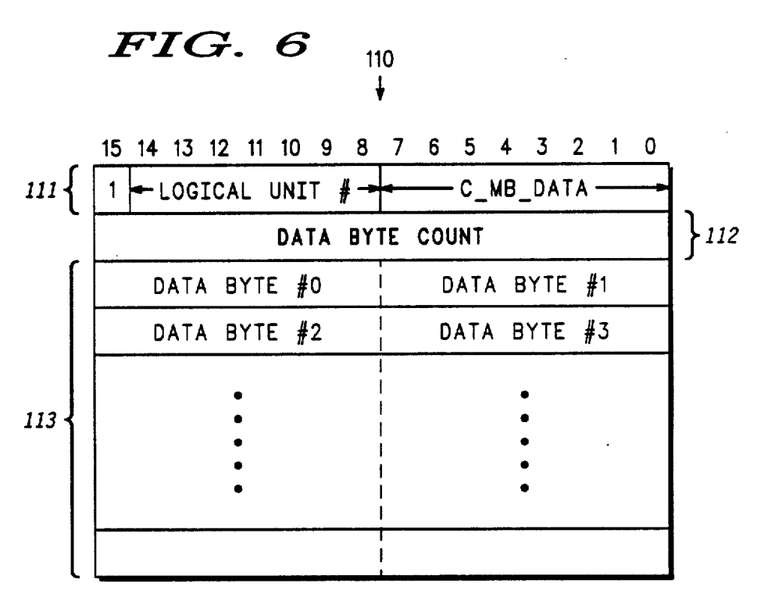
FIG. 6 is an illustration of a multi-byte data transfer block used in the present invention.

Multi-byte data transfer really begins with a command transfer. A multi-byte data transfer block 110 is illustrated in FIG. 6. The first word 111 in multi-byte data transfer block 110 is a control word which contains a C_MB_DATA command byte (see Appendix) in bits 0 through 7, a logical unit number in bits 8 through 14, and a "one" in the command bit position. The second word 112 of multibyte data transfer block 110 contains a count of the number of data bytes to follow. The third and subsequent word, collectively labeled 113, contain the actual data bytes to be transferred.

The number of bytes in words 113 correspond to the data byte count designated in word 112. Even-numbered data bytes are placed in bits 8 through 15, and odd-numbered data bytes are placed in bits 0 through 7. If the transfer contains an odd number of bytes, it may be advantageous to have the last of words 113 contain "zeros" in bits 0 through 7 to indicate that the last data byte has been transferred.

By using the format specified in FIG. 6, data and command transfer occur between processors 16 and 20 along a dual simplex path. While a specific format for control word 120 has been described, it should be apparent to those skilled in the art that variations are possible. For instance, the least significant bit (LSB) of control word 120 could be the command bit if specified as such, etc.

To conclude, when the interface circuit of the present invention is used to interface two different types of computer systems, a user on either system can utilize a processor and/or peripheral equipment associated with either computer system. Efficient functioning is maintained although the buses are asynchronous due to the status, control and interrupt functions of the interfaces.

Data and control transfers are performed between different processors in the overall system according to a protocol which transmits information regarding whether a transfer represents data or a command, which logical unit the transfer is destined to go to, and the specific data or command.

The Appendix provides detailed information regarding bus addressing, interrupt operations, status register operations, bus logic control functions, and command transfers of the present invention. Specific address codes have been omitted, since this will vary depending on the type of bus utilized.

Through the descriptions of the Figures an improved multi-system interface has been disclosed. Further modifications and improvements of the interface will occur to those skilled in the art. We desire it to be understood, therefore, that this invention is not limited to the particular form shown, and we intend in the appended claims to cover all modifications which do not depart from the spirit and scope of this invention.

APPENDIX

| BUS ADDRESSING: | | |
|---|---|---|
| READ | WRITE | FUNCTION |
| X | | Read FIFO data |
| | X | Write FIFO data |
| | X | Enable interrupts |
| | X | Disable interrupts |
| X | | Generate Reset |
| | X | Load interrupt Mask Register |
| | X | Clear interrupt 4 (other CPU reset) |
| | X | Clear interrupt 3 (write buffer full) |
| | X | Clear interrupt 2 (write buffer empty) |
| | X | Clear interrupt 1 (write buffer ½ full) |
| | X | Clear interrupt 0 (receive character available) |
| X | | Read status register (valid lower 8 bits only) |

INTERRUPT OPERATIONS:

I0    Set by the FIFO, serving as a read FIFO register, when there is a character present. I0

APPENDIX-continued will be held until the CLEAR interrupt 0 command is issued.

I1    Set by the FIFO, serving as a write FIFO register, reaching the HALF FULL level. I1 will remain on until the CLEAR interrupt 1 command is issued.

I2    Set by the FIFO, serving as a write FIFO register, reaching the EMPTY state. I2 will be held until the CLEAR interrupt 2 command is issued.

I3    Set by the FIFO, serving as a write FIFO register, reaching the FULL state. I3 will be held on until the CLEAR interrupt 3 command is issued.

I4    Set when the RESET level is applied to the other CPU. I4 will be held as long as the other system reset is asserted. When the other system reset is de-asserted, the interrupt will be cleared.

STATUS REGISTER OPERATION:

S0    This is an unlatched signal which represents the actual current condition of the FIFO serving as a read FIFO register.
     0 = The FIFO is empty.
     1 = The FIFO has an entry.

S1    A latched signal indicating that the FIFO has been filled to the one-half plus 1 entry level.
     1 = The FIFO is half full.
         The bit can be reset by clearing interrupt 1.

S2    A latched signal indicating that the FIFO serving as a write FIFO register has been emptied.
     1 = FIFO is empty.
         This bit can be reset by clearing interrupt 2.

S3    Latched signal indicating the FIFO serving as a write FIFO register has been completely filled.
     1 = FIFO is full.
         This bit can be reset by clearing interrupt 3.

S4    Latched signal indicating the other CPU has done a RESET.
     1 = System holding RESET TRUE.
         This bit can be reset by clearing interrupt 4. If the reset is still being held true, the bit will not reset.

S5    local (read) FIFO full flag (low true, not latched)

S6    local (read) FIFO full flag (low true, not latched)

S7    Summary Bit
     1 = One or more of the Interrupt bits is set. Note that the Empty indicator (S0) is not latched, but the word present [NOT EMPTY] (I0) is latched and reflected in S7. Hence the interrupt status may not represent current status of the FIFO.

BUS LOGIC CONTROL FUNCTIONS:

FIFO READ    Reading this address retrieves a 16 bit word from the onboard (local) FIFO if a word is available.

FIFO WRITE    Writing this address transfers a 16 bit word to the FIFO on the mating interface card (remote FIFO) if it is not full. If the FIFO is full, nothing will be written nor will any error be indicated! Use the FIFO full interrupt or the status register to avoid this condition.

ENABLE INTERRUPTS    Writing to this location enable the OR of interrupts (I0–I4) to be applied to onboard I2. Data is not significant for this instruction.

DISABLE INTERRUPTS    Writing to this location disables the interrupts from the bus. Interrupt status is not changed, but is only de-asserted from the onboard bus. Data is not significant for this operation.

RESET    Reading the RESET address on the logic board will set interrupts I0 thru I4 to all 1's and reset both FIFO's (FIFO Data is LOST).

The Enable/Disable condition of both system's interrupt is not affected. A state signifies an ABORT with possible data loss. No data is returned by this command.

WRITE INTERRUPT MASK REGISTER    Writing an 8-bit byte to the interrupt mask register address allows bits to be sent to the logic board to enable/mask the individual interrupts I0–I3. An "0" bit in the register will mask on the corresponding interrupt. A "1" bit in the register will mask off the corresponding interrupt as follows:
BIT0 I0    BIT4 NOT USED
BIT1 I1    BIT5 NOT USED
BIT2 I2    BIT6 NOT USED
BIT3 I3    BIT7 NOT USED CLEAR I4    Writing this address will clear interrupt I4, which would have been set by a hard reset or a reset command. Data is not significant with this command.

CLEAR I3    Writing to this address will clear interrupt I3 which would have been set by the write (remote) FIFO reaching the full state. This interrupt could also have been set by a hard or soft system reset. Data is not significant with this command.

CLEAR I2    Writing to this address will clear interrupt I2 which would have been set by the write (remote) FIFO reaching the empty state. A hard or soft reset will also set this interrupt true. Data is not significant with this command.

CLEAR I1    Writing to this address will clear interrupt I1 which would have been set by the write (remote) FIFO reaching the half full state. A hard or soft reset will also set this interrupt true. Data is not significant with this command.

CLEAR I0    Writing to this address will clear interrupt I0 which would have been set by the read (local) FIFO reaching the data available state. A hard or soft reset will also set this interrupt true. Data is not significant with this command.

READ STATUS REGISTER    Reading this address will return the logic board's status in the lower 8 bits of the word. The upper 8 bits are not driven by the board and will probably be FF hex.

COMMAND TRANSFERS:

C_RESET    This command is used to reset the PDL interface. It may be issued by either side of the interface.

C_ONLINE    This command is used to signal device availability. It may be issued by either side of the interface.

C_OFFLINE    This command is used whenever a device has become unavailable.

C_SACT    This command is used whenever a device which was temporarily unavailable (see C_SINACT, below) has returned to service. C_SACT may be issued by either side of the interface.

C_SINACT    This command is used whenever a device becomes temporarily unavailable, usually due to the device switching to an alternate session. C_SINACT may be issued by either side of the interface.

C_SEND    This command (in conjunction with C_STOP) provides device level flow control. C_SEND may be issued by either side of the interface.

C_STOP    This command (in conjunction with C_SEND) provides device level flow control. C_STOP may be issued by either side of the interface.

C_MB_DATA    This command signifies the start of a Multibyte Data Transfer.

C_FT_START    This command indicates the beginning of File Transfer Mode.

APPENDIX-continued

| | |
|---|---|
| C_FT_STOP | This command terminates File Transfer Mode. |
| C_FT_RESEND | This command is used to request retransmission of the last File Transfer data block. |
| C_ALARM | This command is used to indicate that data is present for the logical unit but the logical unit is presently inactive (see C_SINACT, above). |
| C_LU_DSP | This command is used to configure the logical unit as an ASCII display device. |
| C_LU_PRT | This command is used to configure the logical unit as an ASCII print device. |
| C_LU_DECONF | This command is used to deconfigure ASCII display and printer devices. |
| C_MB_ACK | This command is used to acknowledge the receipt of a Multi-byte Data Transfer command. It may be sent by either side of the interface when it is determined that enough buffer space exists to receive another multi-byte data transfer. |
| C_NOP | The C_NOP command is used to send a dummy command. It may be sent by either side of the interface. |
| C_CMD_REJ | The C_CMD_REJ command is used whenever the last command received for device is logically incorrect (eg: sending C_SEND when the logical unit is not blocked, etc.) It may be sent by either side of the interface. |
| C_LU_RESET | The C_LU_RESET command resets a specific port. |
| C_BREAK | The C_BREAK command signals the coordinated processor to emulate the processing required to break the transmission. |

We claim:

1. A multi-processor, multi-bus system comprising a first processor coupled to a first bus, a second processor of a type different from said first processor, said second processor being coupled to a second bus, said second bus of a type different from said first bus, the improvement wherein said system comprises:

bus interface means for coupling said first bus to said second bus, said bus interface means comprising:
a first-first-in first-out (FIFO) register stack for receiving data from said second bus and for transmitting data to said first bus;
a second first-in-first-out (FIFO) register stack for receiving data from said first bus and for transmitting data to said second bus;
control logic means coupled to said first and second FIFO register stacks and to said first and second buses for receiving control information from said first and second buses and for controlling the operation of said FIFO register stacks in response to said control information, said control logic means comprising interrupt logic means and status logic means;
first receiver means coupled to said first FIFO register stack;
first transmitter means coupled to said first bus for receiving first data and control information from said first bus and for transmitting said first data and control information to said second FIFO register stack;
second receiver means coupled to said second FIFO register stack; and
second transmitter means coupled to said second bus for receiving second data and control information from said second bus and for transmitting said second data and control information to said first FIFO register stack;
wherein said first receiver means is for receiving said second data and control information from said second transmitter means and said second receiver means is for receiving said first data and control information from said first transmitter means.

2. The system recited in claim 1 and further comprising:
a first plurality of peripheral units coupled to said first bus.

3. The system recited in claim 1 and further comprising:
a second plurality of peripheral units coupled to said second bus.

4. In a multi-processor, multi-bus system comprising a first processor and a controller coupled to a first bus, said controller also being coupled to a first plurality of peripheral units; a second processor of a type different from said first processor, a second plurality of peripheral units, said second processor and said second plurality of peripheral units being coupled to a second bus, said second bus of a type different from said first bus; the improvement wherein said system comprises:

first bus interface means for coupling said first plurality of peripheral units to said second processor, said first bus interface means being coupled between said first and second buses and comprising:
a first first-in-first-out (FIFO) register stack for receiving data from said second bus and for transmitting data to said first bus;
a first control logic means coupled to said first FIFO register stack for receiving first control information from said second bus and for controlling the operation of said first FIFO register stack in response to said first control information;
first receiver means coupled to said second bus for receiving data and control information from said second bus;
first transmitter means coupled to said second bus for transmitting data and control information to said second bus; and
first interrupt means coupled to said first FIFO register stack and to said first receiver means for generating an interrupt signal to said second processor when said first FIFO register stack has been filled to a predetermined level; and
second bus interface means for coupling said second plurality of peripheral units to said first processor, said second bus interface means being coupled between said first and second buses and comprising:
a second first-in-first-out (FIFO) register stack for receiving data from said first bus and for transmitting data to said second bus;
second control logic means coupled to said second FIFO register stack for receiving second control information from said second bus and for controlling the operation of said second FIFO register stack in response to said second control information;
second receiver means coupled to said first bus for receiving data and control information from said first bus;
second transmitter means coupled to said first bus for transmitting data and control information to said first bus; and second interrupt means coupled to said second FIFO register stack and to said second receiver means for generating an interrupt signal to said first processor when said second FIFO register stack has been filled to a predetermined level.

5. In a multi-processor system comprising two processors each coupled to a different type of system bus, a method of interfacing between said two processors, said method comprising:

using an N-bit control word to preface data control information to be passed from one processor to the other, said control word comprising an R-bit information portion, an S-bit destination portion, and a T-bit data type portion for indicating whether said R-bit portion contains data or control information, wherein N is 16, R is 8, S is 7, and T is 1 and wherein said T-bit portion indicates whether the R-bit portion contains control information, the R-bit portion indicates a multi-byte data transfer, and said S bit portion indicates the logical unit requesting the transfer;

utilizing a 16-bit count word following said control word for indicating the number of data bytes which follow and that are to be transferred; and storing said data bytes in a plurality of 16-bit data words following said count word.

6. The method recited in claim 5, wherein when T is a logical "one" it indicates that said R-bit portion contains a data command byte and when T is a logical "zero" it indicates that said R-bit portion contains a data byte.

7. The method recited in claim 5, wherein even-numbered bytes are placed in most significant bits 8-15 of said data words and odd-numbered bytes are placed in least significant bits 0-7 of said data word.

8. The method recited in claim 7, wherein if said count word indicates an odd number of data bytes to be transferred, the last one of said plurality of data words has logical "zeros" in bits 0-7 in order to indicate that the last data byte has been transferred.

* * * * *